United States Patent
Otto et al.

(10) Patent No.: US 9,524,084 B2
(45) Date of Patent: Dec. 20, 2016

(54) PRESENTING IMAGES OF MULTIPLE MEDIA ENTITIES

(71) Applicant: Google Inc., Mountain View, CA (US)

(72) Inventors: Owen Daniel Otto, Berkeley, CA (US); Taddeo Zacchini, San Francisco, CA (US); Brandon Bilinski, San Francisco, CA (US)

(73) Assignee: Google Inc., Mountain View, CA (US)

( * ) Notice: Subject to any disclaimer, the term of this patent is extended or adjusted under 35 U.S.C. 154(b) by 254 days.

(21) Appl. No.: 14/089,784

(22) Filed: Nov. 26, 2013

(65) Prior Publication Data

US 2015/0149901 A1    May 28, 2015

(51) Int. Cl.
*G06F 3/048* (2013.01)
*G06F 3/0484* (2013.01)
*G06F 17/30* (2006.01)
*H04N 21/482* (2011.01)

(52) U.S. Cl.
CPC ....... *G06F 3/0484* (2013.01); *G06F 17/30053* (2013.01); *H04N 21/4825* (2013.01)

(58) Field of Classification Search
CPC ............. G10H 1/0008; G06F 17/30053; G06F 3/0484; H04N 21/4825
USPC .......................... 715/716, 719, 727, 729, 730
See application file for complete search history.

(56) References Cited

U.S. PATENT DOCUMENTS

| | | | |
|---|---|---|---|
| 2007/0139410 A1* | 6/2007 | Abe .................. | G06F 17/30749 345/440 |
| 2010/0017438 A1 | 1/2010 | Haartsen et al. | |
| 2010/0023485 A1 | 1/2010 | Chu | |
| 2010/0092107 A1* | 4/2010 | Mochizuki .......... | H04N 9/8211 382/309 |
| 2010/0318939 A1* | 12/2010 | Moon ............... | G06F 17/30038 715/830 |
| 2012/0227077 A1 | 9/2012 | Spivack et al. | |
| 2012/0323938 A1* | 12/2012 | Skeen ............... | G06F 17/30752 707/754 |

* cited by examiner

*Primary Examiner* — Ajay Bhatia
*Assistant Examiner* — Phuong Nguyen
(74) *Attorney, Agent, or Firm* — Morris & Kamlay LLP

(57) ABSTRACT

Methods and systems for presenting multiple images of entities associated with media items in a media list are provided. A method may include identifying a first entity associated with a first media item in a media list. The first media item may be associated with a first time period. A second entity associated with a second media item may be identified in the media list. The second media item may be associated with a second time period. Next, from a database of entity images, a first image of the first entity may be selected based on the first time period and a second image of the second entity may be selected based on the second time period. As a result, the first image and the second image may be presented in an interface during activation of the media list.

31 Claims, 3 Drawing Sheets

| | |
|---|---|
| 201 | |
| Suit & Tie<br>Justin Timberlake ft. Jay Z | 202 |
| Say My Name<br>Destiny's Child | 203 |
| Rock Your Body<br>Justin TImberlake | 204 |
| Soldier<br>Destiny's Child | 205 |
| Diamonds<br>Rihanna | 206 |
| Mirrors<br>Justin TImberlake | 207 |

| | |
|---|---|
| 201 | |
| Suit & Tie<br>Justin Timberlake ft. Jay Z | 202 |
| Say My Name<br>Destiny's Child | 203 |
| Rock Your Body<br>Justin Timberlake | 204 |
| Soldier<br>Destiny's Child | 205 |
| Diamonds<br>Rihanna | 206 |
| ‖  Mirrors<br>Justin Timberlake | 207 |

FIG. 2

PRESENTING IMAGES OF MULTIPLE MEDIA ENTITIES

BACKGROUND

Media applications typically provide pages and/or interfaces for displaying containers of media items, such as lists of media items. For example, a media item may be a song, a movie, a book, a video, and the like. A list of media items may be, for example, an album, a playlist, a collection of newly-released ("new release") media items, recently purchased media items, and the like. In order to make the pages for displaying media items beautiful and engaging without significant production of manual graphics, an image associated with a media item may be presented. For example, album artwork or the cover photo of an album may be presented when a song from the album is being played. However, when a list of media items includes multiple media items associated with multiple various entities (e.g., multiple artists), it can be difficult to determine which photos to present when displaying the list of media items.

BRIEF SUMMARY

According to an embodiment of the disclosed subject matter, a method includes identifying a first entity associated with a first media item in a media list, and the first media item may be associated with a first time period. A second entity may be identified as being associated with a second media item in the media list. The second media item may be associated with a second time period. Next, a first image of the first entity may be selected, from a database of entity images, based on the first time period. A second image of the second entity may be selected, from a database of entity images, based on the second time period. The first image and the second image may be presented in an interface during activation of the media list.

An implementation of the disclosed subject matter provides a system including a processor configured to identify a first entity associated with a first media item in a media list. The first media item may be associated with a first time period. A second entity associated with a second media item may be identified in the media list, and the second media item may be associated with a second time period. From a database of entity images, a first image of the first entity may be selected based on the first time period. Next, a second image of the second entity may be selected, from the database of entity images, based on the second time period. The first image and the second image may be presented in an interface during activation of the media list.

Implementations of the disclosed subject matter may present multiple images of media entities, each image associated with a media item in a media list provided by a media application. This may allow a user to view images of the creators of media items while accessing a list of multiple media items in a media application. This may improve a user's experience when using a media application by creating a more engaging, enjoyable, beautiful interface and may result in increased user satisfaction. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 2 shows an example interface according to an implementation of the disclosed subject matter.

DETAILED DESCRIPTION

Figure 1:
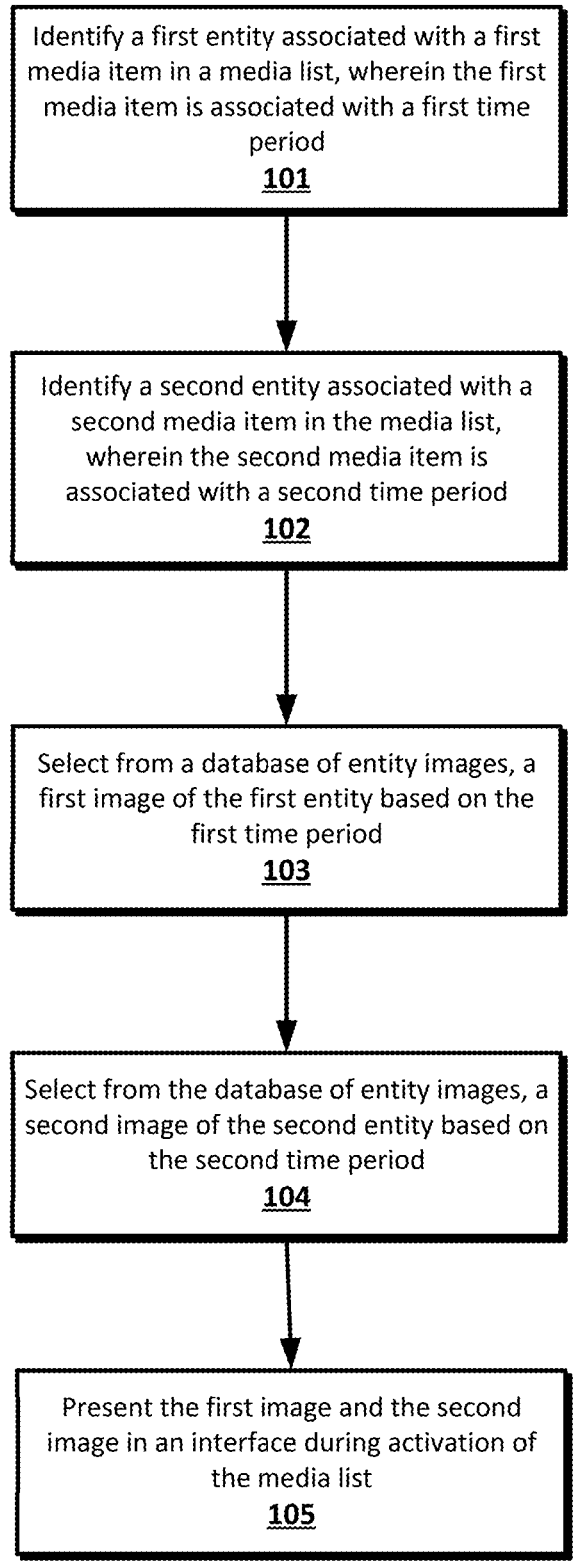
FIG. 1 shows an example process according to an implementation of the disclosed subject matter.

Media applications such as media players typically provide functionality for activating media items. Because of the volume of media items that may be available for activation, these media applications typically provide interfaces and screens for displaying containers of multiple media items. A container of media items may be, for example, an album, a playlist, or a category of media items such as recently purchased media items, recommended media items, a library of media items, and the like. In general, a container is a list of multiple media items. A media item may be an album, a song, a movie, a video, a show, a book, and the like, and a media item may be activated by an action such as playing, selecting, or viewing a media item. In some conventional media applications, when a particular media item is activated in the application, an official image associated with the media item may be presented. Examples of official images may be album artwork associated with an album or a song in an album, an image associated with a song single, a movie cover associated with a movie, a book cover associated with a book, and the like. However, when a container of multiple media items is activated, it may be difficult to determine which image or images should be presented. For example, during activation of a playlist or compilation album including songs from various artists, it may be difficult to choose images associated with each of the media items and/or artists to present during playback. As another example, a specific song may have been released as a single, on one or more albums, and also used in one or more movie soundtracks. Conventional media applications may select the single cover image, one of the album cover images, or a cover for a movie soundtrack album as the official image for the song and display it. However, the user may only be familiar with the song from one of these sources, which may not match the one selected by the media application.

The present disclosure provides a method of presenting images of entities associated with media items in a media application. For a given list of media items, it may be determined that the list includes media items, each media item associated with an entity (e.g., an artist, an actor, an author, a celebrity, and the like). For each media item, a time period may be determined, such as the release date of a song, album, movie, compilation, a significant event in a musician's career, or the like. An image associated with the entity may be selected, from a database of entity images, based on the time period. The time period may be used to select an image of the entity. For example, if the release date of a song is in 2008, an image of the artist who performed the song as he/she appeared in a concert in 2008 may be selected. By selecting an image from a time period associated with a media item, the image of an entity may be relevant to the time period of the media item. As an example, if a playlist includes a song by Miley Cyrus from 2006, an image of Miley Cyrus from 2006 may be presented rather than an image of Miley Cyrus from 2013.

Next, the selected images of the entities may be presented in the media application during activation of the list of media items, such as in a slideshow presented during playback of a playlist of media items. For a media item that is associated with more than one entity, an image associated with each entity may be selected and a compilation image may be generated such as a collage of including each of the images of each of the entities. This compilation image may be included in the slideshow.

As an example, a media list may be a playlist including multiple media items such as songs. The playlist may include the songs "Umbrella" by Rihanna released in 2009, "Princess of China" by Coldplay featuring Rihanna released in 2012, and "Mirrors" by Justin Timberlake released in 2013. An entity associated with each media item may be determined. For example, for the song "Umbrella" by Rihanna the entity may be Rihanna, for the song "Princess of China" by Coldplay featuring Rihanna the entities may be both Coldplay and Rihanna, and for the song "Mirrors" by Justin Timberlake, the entity may be Justin Timberlake. In addition, a time period associated with each media item may be determined. For example, for the song "Umbrella" by Rihanna the time period may be 2009, for the song "Princess of China" by Coldplay featuring Rihanna the time period may be 2012, and for the song "Mirrors" by Justin Timberlake the time period may be 2013. Next, an image associated with each entity based on the time period may be selected from a database of entity images. For example, for the entity Rihanna and time period of 2009, an image of Rihanna from 2009 may be selected from the database; for the entities Coldplay and Rihanna, and the time period of 2012, an image of Coldplay from 2012 and an image of Rihanna from 2012 may be selected from the database; and for the entity Justin Timberlake and the time period of 2013, an image of Justin Timberlake from 2013 may be selected from the database. For the entities Coldplay and Rihanna, a collage may be created of both pictures of Coldplay and Rihanna from 2012. Next, the selected entity images may be presented, such as in a slideshow including the image of Rihanna from 2009, the collage of Coldplay and Rihanna from 2012, and the image of Justin Timberlake from 2013. This slideshow may be presented during playback of the playlist.

In general, the present disclosure proposes a method for presenting images of multiple media entities in a media application. FIG. 1 shows an example process according to an implementation of the disclosed subject matter. A method may include identifying a first entity associated with a first media item in a media list, and the first media item may be associated with a first time period, at 101. A media list may be any list of media items in a media application. For example, a media list may be a playlist, a library of media items, recently played media items, recently added albums, recently purchased media items, recommended media items, recommended new releases, and the like. A media item may be any media that may be presented in a media application such as a song, an album, a video, a book, a movie, a show, and the like. An entity associated with a media item may be a creator of the media item. For example, an entity may be one or more artists, one or more actors, one or more celebrities, a music group, one or more authors, and the like. At 102, a second entity associated with a second media item in the media list may be identified. The second media item may be associated with a second time period. Next, from a database of entity images, a first image of the first entity may be selected based on the first time period, at 103. A second image of the second entity may be selected from the database of entity images based on the second time period, at 104. The first image and the second image may be presented in an interface during activation of the media list, at 105. For example, the first and second images may be presented in an interface upon activation of the media list including the first and second media items. According to an implementation, an image may be presented in the interface upon activation of a media item in the media list. For example, the first image may be presented upon activation of the first media item and the second image may be presented upon activation of the second media item.

The time period associated with a media item may any period of time or date that may be used to select a relevant image of an entity associated with the particular media item. According to an implementation, a time period includes a date and may be in any format suitable for representing a date such any combination of month, date, day, year, decade (e.g., 70's, 80's, 90's, and the like), and the like. For example, a time period associated with a media item may be a release date, an event date, an achievement date, and the like. A release date associated with a media item may be the date on which a media item was released, for example, the release date of an album, the release date of a song single, the release date of a music video associated with a song, the release date of a book, a TV show's premier date, the release date of a video or movie, and the like. Examples of an event date associated with a media item may be a concert date, a book signing date, a movie premier date, and the like. An achievement date may be a date on which a media item reached an achievement in an industry. For example, an achievement date may be the date a particular album reached a high ranking in an album ranking, the date a song reached a high ranking in a song ranking (e.g., #1 on Billboard music chart), the date a movie/book/show was nominated for or received an award, and the like. In some cases, a time period may be a range of dates associated with a media item. For example, for a media item that was released on Jul. 11, 2012, the time period associated with the media item may be a range including all of 2012, e.g., Jan. 1, 2012-Dec. 31, 2012. In this case, an image may be selected based on the time period range of Jan. 1, 2012-Dec. 31, 2012. Similarly, the time period may be July of 2012, i.e., July 1-Jul. 31, 2012. Any other suitable range may be selected or generated based upon a single date as disclosed herein.

As mentioned above, the time period may be used to select an image of the entity associated with a media item. For example, a media item may be the song "Wrecking Ball" by Miley Cyrus. The entity associated with the song may be Miley Cyrus. Additionally, the song "Wrecking Ball" may be associated with a time period of 2013 which may be the release year of the song. Accordingly, an image of Miley Cyrus may be selected from a database of images. In particular, the image may be selected based on the 2013 time period of the song. As such, an image of Miley Cyrus from 2013 may be selected and presented during activation of the song or activation of a media list including the song.

According to an implementation, an interface may present the selected images of entities during activation of a media list. The selected images may be presented in a slideshow, for example, the images may be displayed one after another in a slideshow, with each image appearing for few seconds. In an implementation, the images may be presented in random order or in sequence based on the order of the related media items in the media list. Various transitions may be used between images, such as a crossfade, slide in, and the like. In some cases, the interface may present the selected images in a slideshow that may or may not be controlled by a user in the media application. For example, a slideshow of entity images may advance through each image automatically or a user may advance through each image by scrolling, swiping or selecting images. According to an implementation, rather than present the images one at a time, e.g., in a slideshow, all of the selected images could be stitched together into one collage.

In general, an image of an entity as described herein is not an official image associated with a media item, e.g., album artwork, an album cover, a book's cover, a movie poster, a song single cover, and the like. Instead, an image of an entity may be an "unofficial" image of an entity, i.e., one that is not the published image of the entity for the particular media item, which may have been selected by a distributor, publisher, editor, or the like. For example, a photograph of an entity at an event, a candid photograph of an entity, a published photo of an entity not associated with an entity's media item, and the like may be an "unofficial" image as disclosed herein. In some cases where a time period associated with a media item is an event date such as a concert date, the selected image may be an image of the entity performing at the concert. As mentioned above, a time period associated with a media item may be an achievement date. For example, Academy Award winning movie "Argo" may be associated with an entity, the actor Ben Affleck. The movie may also be associated with a time period of Feb. 24, 2013, i.e., the date on which "Argo" received an Academy Award for Best Picture. When a media list including "Argo" is activated or when the movie "Argo" is activated in a media application, an image may be selected of Ben Affleck, for example, the image may be of Ben Affleck on stage receiving the award for Best Picture taken during the Academy Awards on Feb. 24, 2013.

According to an implementation, an image may have an image date indicating the date on which the image was created and/or taken. This image date may be used for selecting an image to present based on a comparison of the image date with the time period. For example, for a media entity associated with a time period of Jan. 12, 1980, an image of the entity having an image date of Jan. 12, 1980 may be selected. If the database does not include an image of an entity having an image date of Jan. 12, 1980, an image of the entity having an image date in the year 1980 may be selected. Alternatively, for a media item that was released on Jan. 12, 1980, the time period associated with the media item may be broadened to include all of the year 1980, in which case, an image having an image date anytime during the year 1980 may be selected. In some cases, an image may be selected based on the image date being within a minimum threshold range from the date of the time period. For example, a database of images may include multiple images of Miley Cyrus, each image having an image date. Based on a time period of 2013, an image having an image date of 2013 may be selected. Additionally, an image having an image date within, for example, plus or minus 1 year from 2013 may be selected. The minimum threshold range from the time period may be based on a default setting, a user setting, and/or a system setting. In some cases, the minimum threshold range may change based on the images available in the database. For example, the time period associated with the movie "Fight Club" may be 1999 and an entity associated with the movie may be Brad Pitt. The minimum threshold range may be plus or minus 1 year from 1999. In this case, an image of Brad Pitt having an image date within the range of 1998 to 2000 may be selected from the database. If, however, there are no images of Brad Pitt having an image date within the range of 1998 to 2000, the minimum threshold range may be adjusted such that an image of Brad Pitt having an image date closest to the range of 1998 to 2000 is included in the range. As such, an image of Brad Pitt having an image date of, for example, 1997 may be selected. These various techniques for selecting an image based on the time period may ensure presentation of an available image of an entity that is most relevant to the particular time period of the media item.

In some instances, a media list may include multiple media items, and two or more of the media items may be associated with the same entity. For example, a media list may include the song "Can't Buy Me Love" by the Beatles and all 14 songs from the Mylo Xyloto album by Coldplay. An image of the Beatles may be selected based on the time period of 1964 associated with the song "Can't Buy Me Love." As for the 14 songs from the Mylo Xyloto album, it may be the case that each of the 14 songs is associated with the same time period 2011, i.e., the album release date. An image of Coldplay may be selected based on the time period of 2011. The selected image of the Beatles and the selected image of Coldplay may be presented in a slideshow during activation of the media list. In some cases, rather than presenting the same selected image of Coldplay 14 times for each of the 14 songs in the list, the selected Coldplay image may only be included in the slideshow once, such that the selected image of the Beatles and the selected image of Coldplay are the only two images presented in the slideshow. According to an implementation, the selected image of Coldplay may be presented for a long duration of time in the slideshow, as compared to the selected image of the Beatles, to account for the number of Coldplay songs in the media list. Alternatively, if there are multiple images of Coldplay from 2011 available in the database, these multiple images of Coldplay from 2011 may be selected and presented in the slideshow.

According to an implementation, a system may include a processor configured to identify a first entity associated with a first media item in a media list. The first media item may be associated with a first time period. A second entity associated with a second media item may be identified in the media list. The second media item may be associated with a second time period. Next, from a database of entity images, a first image of the first entity may be selected based on the first time period and a second image of the second entity may be selected based on the second time period. As a result, the first image and the second image may be presented in an interface during activation of the media list. Activation of a media list or a media item may be any action received from a user in a media application or any action taken in response to a request from a user in a media application. For example, activating a media list or a media item may be action such as playing, displaying, selecting, and the like. For example, a media application may provide an interface presenting one or more containers of media items to a user. A container of media items may include a list of media items such as a playlist, a library of media items, recently played media items, recently added albums, recently purchased media items, recommended media items, recommended new releases, and the like. From the interface presenting multiple various containers of media items, a user may activate a specific container, such as the list of recently purchased media items by selecting (e.g., by clicking on) a link to the list. A user may activate a playlist by selecting a link to the playlist causing a list of the media items in the playlist to be displayed. Additionally, a user may activate a media item in a list by selecting, playing, displaying the media item in the media application.

FIG. 2 shows an example interface according to an implementation of the disclosed subject matter. A media list including two or more media items may be displayed in a media application. For example, as shown in FIG. 2, a media list may be a playlist including six songs 202, 203, 204, 205, 206, and 207. A portion of the interface, 201, may present selected images of entities associated with the songs during activation of the playlist and/or activation of each of the songs 202, 203, 204, 205, 206, and 207. For example, the entity Justin Timberlake may be identified for the currently playing song 207 Mirrors by Justin Timberlake. The song 207 Mirrors by Justin Timberlake may be associated with a time period such as Feb. 11, 2013 (i.e., the release date of the song). From a database of entity images, an image of the entity Justin Timberlake may be selected based on the time period of Feb. 11, 2013. For example, an image of Justin Timberlake taken in 2013 may be selected and this image may be presented in the interface at 201.

For song 206 "Diamonds" by Rihanna, the entity Rihanna may be identified and the song 206 "Diamonds" may be associated with the time period Sep. 27, 2012, i.e., the date the song was released. From the database, an image of Rihanna may be selected based on the time period of Sep. 27, 2012. For example, there may be multiple images of Rihanna available in the database. The database may include an image of Rihanna created on Sep. 27, 2012, an image of Rihanna created in 2012 on a date other than Sep. 27, 2012, an image of Rihanna created in 2011, and an image of Rihanna created in 2013. From among these images, the image of Rihanna created on Sep. 27, 2012 may be selected based on the time period of Sep. 27, 2012 and presented in the interface at 201. Alternatively, because the song "Diamonds" was released on Sep. 27, 2012, the time period associated with the song may be a range including all of 2012, i.e., Jan. 1, 2012-Dec. 31, 2012. As a result, an image of Rihanna created any time during 2012 may be selected. In another implementation, the image of Rihanna create in 2011 may have an image date of Dec. 12, 2011 and the image of Rihanna created in 2013 may have an image date of Jan. 4, 2013. There may be a setting indicating that an image may be selected based an image date being within a minimum threshold range, for example, plus or minus 1 year, from the date of the time period. As a result, because the image date of the 2011 image, i.e., Dec. 12, 2011, is within plus or minus 1 year from Sep. 27, 2012, the 2011 image may be selected and presented. Similarly, because the image date of the 2013 image, i.e., Jan. 4, 2013, is within plus or minus 1 year from Sep. 27, 2012, the 2013 image may be selected and presented.

In general, a media list may include more than one media item associated with the same entity. In some instances, a first media entity and a second media entity may be the same, and the first time period may be different from the second time period. For example, as shown in FIG. 2, in addition to song 207 "Mirrors", another song 204 "Rock Your Body" by Justin Timberlake may be included in the media list. Although the song 204 "Rock Your Body" was released on Apr. 8, 2003, the song 204 may be associated with the time period of Feb. 1, 2004, i.e., the date on which Justin Timberlake performed the song in concert at the Super Bowl XXXVIII Halftime show. Based on the time period of Feb. 1, 2004, an image of Justin Timberlake may be selected from the database. For example, an image of Justin Timberlake performing at the Super Bowl XXXVIII Halftime show may be presented. Although the media list includes two songs 207 and 204, each associated with the same entity Justin Timberlake, the images selected for each song 207 and 204 are different based on each song 207 and 204 being associated with a different time period.

As another example, as shown in FIG. 2, songs 203 and 205 may both be associated with the same entity Destiny's Child. Song 203 "Say My Name" may be associated with the time period of the year 2000. In the year 2000, the entity Destiny's Child was a group of artists which included four members. Based on the time period of the year 2000, an image of Destiny's Child may be selected from the database. In particular, the image may show Destiny's Child including four members in the group. Song 205 "Soldier" may be associated with the time period of the year 2004. In the year 2004, the membership of the group entity Destiny's Child had changed and the group included three members. Based on the time period of 2004, an image of Destiny's child may be selected from the database. Specifically, the image may show the group Destiny's Child is it existed including three members in 2004. Although the same entity Destiny's Child is associated with two songs 203 and 205 in the media list, the image selected for each song 203 and 205 is different based on the different time periods associated with each song. In this case, because the membership of the group entity Destiny's Child changed over time, the images presented at 201 are relevant to the group entity as it existed at the time the song was created.

In some cases, an entity may include two or more creators of a media item. As shown in FIG. 2, both Justin Timberlake and Jay Z may be identified as the entity associated with the song 202 "Suit & Tie." In this case, an image of an entity may comprise an image of each creator of a media item. The time period associated with the song 202 "Suit & Tie" may be 2013. Based on the time period of 2013, an image of Justin Timberlake from 2013 may be selected from the database. In addition, an image of Jay Z from 2013 may be selected from the database. Because there are two creators included in the entity identified for the song "Suit & Tie," an image may be created that includes both the selected image of Justin Timberlake and the selected image of Jay Z. For example, a collage may be created including both selected images of Justin Timberlake and Jay Z the collage may be presented at 201.

As mentioned above, each of the images selected for each of the media items in the media list may be presented in the interface at 201. In some cases, each selected image may be presented during activation of the relevant media item. In some instances, all of the images may be presented in the form of a slideshow, a collage, or any other arrangement for presenting multiple images, during activation of the playlist. For example, as shown in FIG. 2, although the song 207 is currently playing, all of the selected images associated with all of the media items in the list may be presented at 201 in a slideshow during playback of the playlist or any of songs 202, 203, 204, 205, 206, and 207. As an example, when any one of the songs 202, 203, 204, 205, 206, and 207 are activated, the relevant image associated with the activated song may be initially presented (e.g., for the first 5 seconds of playback), followed by presentation of all of the images associated with the songs 202, 203, 204, 205, 206, and 207. In the case of a slideshow, the images may be advanced automatically, or a user may be able to advance through the images such as by scrolling, swiping or clicking on 201. In some instances, an image presented at 201 may include a link, for example, to a webpage. As such, a user may be able to click on an image at 201 and receive additional information about the entity (e.g., during the time period), the image (e.g., image date, location, etc.), the media item, and the like.

A database of entity images may be provided by an image provider or may be associated with a media application provider. A database of entity images may be a collection of images from one or more sources of images. More than one database of entity images may be accessed for selecting images. In some instances, a database of entity images may be based on access to multiple image databases which may or may not be maintained by multiple image providers.

In an implementation, the communication between a media application provider and an image provider (e.g., a database of images) may be across one or more bridges between the interfaces. For example, the communications between the media application provider and the image provider may be managed or assisted by a third device, such as, a coordinating device, a local coordinator, a remote server, etc. In such cases, the third device may, for example, identify an entity associated with a media item in a media list. The third device may then provide the identified entity and the time period associated with the media item to image provider, in which case, the image provider may provide an image of the entity based on the time period. Alternatively, the third device may receive both an identified entity and a time period associated with the media item from a media application provider, and the third device provide this information to the image provider. Furthermore, more than one intermediate device may be implemented to facilitate communication between devices and an application provider.

Figure 3:
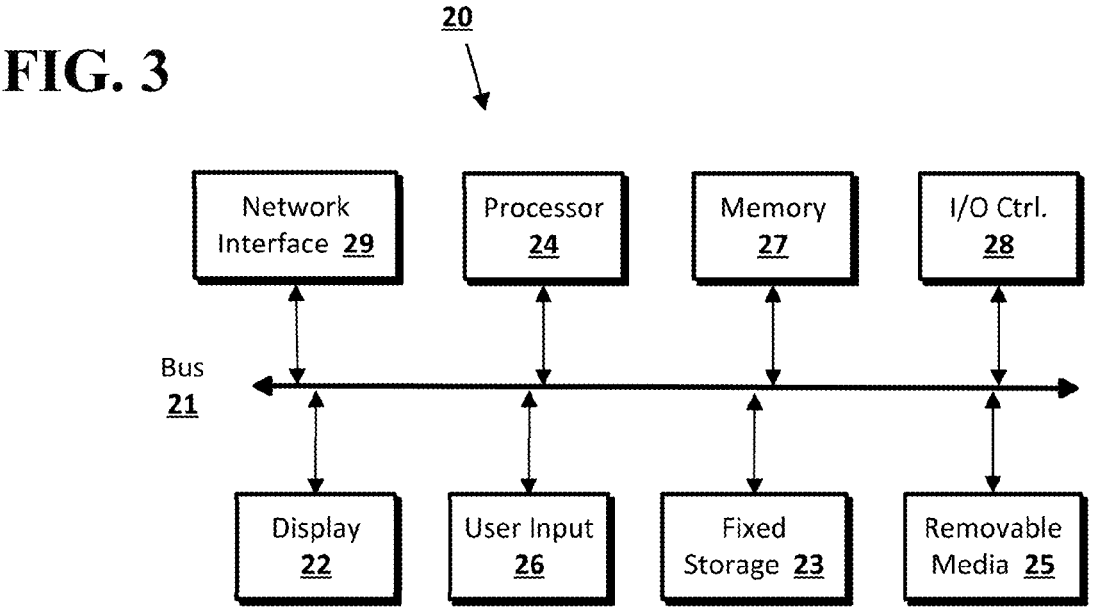
FIG. 3 shows a computer according to an embodiment of the disclosed subject matter.

Embodiments of the presently disclosed subject matter may be implemented in and used with a variety of component and network architectures. FIG. 3 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 4.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
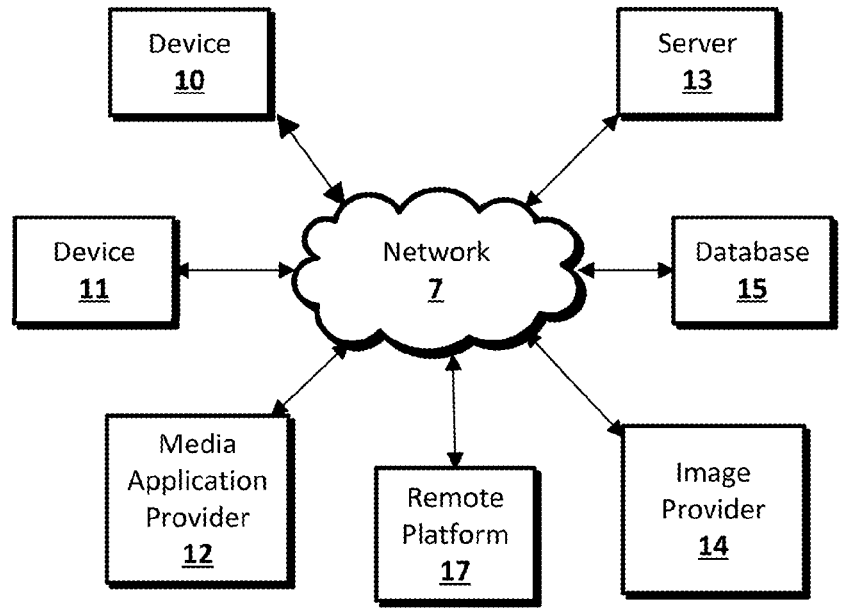
FIG. 4 shows a network configuration according to an embodiment of the disclosed subject matter.

FIG. 4 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13, media application providers 12, image providers 14, and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13, media application providers 12, image providers 14, and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   identifying a first entity associated with a first media item in a media list, wherein the first media item is associated with a first time period;
   identifying a second entity associated with a second media item in the media list, wherein the second media item is associated with a second time period;
   selecting, from a database of entity images, a first image of the first entity, the first image having an image date indicating a date on which the first image was created, the selecting based on the image date being within a threshold range from a date of the first time period, the threshold range being broadened from a first threshold range to a second threshold range in response to a lack of the first image in the database of entity images having the image date within the first threshold range;
   selecting, from the database of entity images, a second image of the second entity based on the second time period; and
   presenting the first image and the second image in an interface during activation of the media list.

2. The method of claim 1, further comprising presenting the first image in the interface upon activation of the first media item.

3. The method of claim 1, wherein the interface presents the first image and the second image in a slideshow.

4. The method of claim 1, wherein the first time period is a release date associated with the first media item.

5. The method of claim 1, wherein the second time period is a release date associated with the second media item.

6. The method of claim 1, wherein the first time period and the second time period are each independently selected from the group consisting of: a release date associated with the media item, an event date associated with the media item, and an achievement date associated with the media item.

7. The method of claim 1, wherein the first image includes a link to a webpage.

8. The method of claim 1, wherein the first entity and the second entity are the same, and the first time period is different from the second time period.

9. The method of claim 1, wherein the first entity is a creator of the first media item.

10. The method of claim 1, wherein the second entity is a creator of the second media item.

11. The method of claim 1, wherein the first entity comprises two or more creators of the first media item.

12. The method of claim 11, wherein the first image comprises an image of each creator of the first media item.

13. The method of claim 1, wherein each of the first entity and the second entity is independently selected from the group consisting of: one or more artists, one or more actors, one or more celebrities, a music group, and one or more authors.

14. The method of claim 1, wherein each of the first media item and the second media item is independently selected from the group consisting of: a song, an album, a video, a book, a movie, and a show.

15. The method of claim 1, wherein the media list is selected from the group consisting of: a playlist, a library of media items, recently played media items, recently added albums, recently purchased media items, recommended media items, and recommended new releases.

16. The method of claim 1, wherein the activation of the media list is an action initiated by a user selected from the group consisting of: playing, displaying, and selecting.

17. A system comprising:
   a processor configured to:
      identify a first entity associated with a first media item in a media list, wherein the first media item is associated with a first time period;
      identify a second entity associated with a second media item in the media list, wherein the second media item is associated with a second time period;
      select, from a database of entity images, a first image of the first entity, the first image having an image date indicating a date on which the first image was created, a selection based on the image date being within a threshold range from a date of the first time period, the threshold range being broadened from a first threshold range to a second threshold range in response to a lack of the first image in the database of entity images having the image date within the first threshold range;
      select, from the database of entity images, a second image of the second entity based on the second time period; and
      present the first image and the second image in an interface during activation of the media list.

18. The system of claim 17, wherein the processor is further configured to present the first image in the interface upon activation of the first media item.

19. The system of claim 17, wherein the interface is configured to present the first image and the second image in a slideshow.

20. The system of claim 17, wherein the first time period is a release date associated with the first media item.

21. The system of claim 17, wherein the second time period is a release date associated with the second media item.

22. The system of claim 17, wherein the first time period and the second time period are each independently selected from the group consisting of: a release date associated with the media item, an event date associated with the media item, and an achievement date associated with the media item.

23. The system of claim 17, wherein the first entity and the second entity are the same, and the first time period is different from the second time period.

24. The system of claim 17, wherein the first entity is a creator of the first media item.

25. The system of claim 17, wherein the second entity is a creator of the second media item.

26. The system of claim 17, wherein each of the first entity and the second media entity is independently selected from the group consisting of: one or more artists, one or more actor, one or more celebrity, a music group, and one or more authors.

27. The system of claim 17, wherein each of the first media item and the second media item is independently selected from the group consisting of: a song, an album, a video, a book, a movie, and a show.

28. The system of claim 17, wherein the media list is selected from the group consisting of: a playlist, a library of media items, recently played media items, recently added albums, recently purchased media items, recommended media items, and recommended new releases.

29. The system of claim 17, wherein the activation of the media list is an action initiated by a user selected from the group consisting of: playing, displaying, and selecting.

30. A method comprising:

identifying a first entity associated with a first media item in a media list, wherein the first media item is associated with a first time period;

identifying a second entity associated with a second media item in the media list, wherein the second media item is associated with a second time period;

selecting, from a database of entity images, a first image of the first entity based on the first time period;

selecting, from the database of entity images, a second image of the second entity based on the second time period; and presenting the first image and the second image in a slideshow in an interface during activation of the media list, wherein a ratio of a duration of a presentation of the first image in the slideshow to a duration of a presentation of the second image in the slide show corresponds to a ratio of a number of media items in the media list associated with the first entity to a number of media items in the media list associated with the second entity.

31. A system comprising:

a processor configured to:

identify a first entity associated with a first media item in a media list, wherein the first media item is associated with a first time period;

identify a second entity associated with a second media item in the media list, wherein the second media item is associated with a second time period;

select, from a database of entity images, a first image of the first entity based on the first time period;

select, from the database of entity images, a second image of the second entity based on the second time period; and present the first image and the second image in an interface during activation of the media list, wherein a ratio of a duration of a presentation of the first image in the slideshow to a duration of a presentation of the second image in the slide show corresponds to a ratio of a number of media items in the media list associated with the first entity to a number of media items in the media list associated with the second entity.

* * * * *